(12) United States Patent
Lee

(10) Patent No.: US 7,987,141 B2
(45) Date of Patent: Jul. 26, 2011

(54) DYNAMICALLY CHANGING LABEL SIZE DURING MAIL PROCESSING

(75) Inventor: Raymond Lee, Chicago, IL (US)

(73) Assignee: Bowe Bell & Howell Company, Durham, NC (US)

( * ) Notice: Subject to any disclaimer, the term of this patent is extended or adjusted under 35 U.S.C. 154(b) by 320 days.

(21) Appl. No.: 11/340,835

(22) Filed: Jan. 27, 2006

(65) Prior Publication Data
US 2006/0201348 A1 Sep. 14, 2006

Related U.S. Application Data

(60) Provisional application No. 60/647,432, filed on Jan. 28, 2005.

(51) Int. Cl.
*G06Q 30/00* (2006.01)
*G06F 7/00* (2006.01)
*B29C 65/00* (2006.01)
*B32B 37/00* (2006.01)

(52) U.S. Cl. .................. 705/337; 700/230; 156/DIG. 1; 156/DIG. 28; 156/DIG. 33; 156/598

(58) Field of Classification Search ........................ 705/1
See application file for complete search history.

(56) References Cited

U.S. PATENT DOCUMENTS

| | | | |
|---|---|---|---|
| 2,552,312 A | 5/1951 | Frank | |
| 2,866,503 A | 12/1958 | Townsend et al. | |
| 3,435,717 A | 4/1969 | Macomber | |
| 3,710,667 A | 1/1973 | Kluger | |
| 3,867,861 A | 2/1975 | Hamisch, Sr. | |
| 3,996,855 A | 12/1976 | Pabodie | |
| 4,707,211 A | 11/1987 | Shibata | |
| 4,825,741 A | 5/1989 | Wellington et al. | |
| 5,064,488 A * | 11/1991 | Dickey | 156/159 |
| 5,229,587 A | 7/1993 | Kimura et al. | |
| 5,427,029 A | 6/1995 | Dumke | |
| 5,478,880 A | 12/1995 | Shipston et al. | |
| 5,503,702 A | 4/1996 | Filicicchia et al. | |
| 5,550,745 A | 8/1996 | Wurz | |
| 5,556,492 A * | 9/1996 | Vonderhorst et al. | 156/64 |
| 5,674,345 A | 10/1997 | Nash | |
| 5,776,297 A | 7/1998 | Edwards et al. | |
| 5,783,032 A * | 7/1998 | O'Callaghan et al. | 156/556 |
| 5,804,023 A | 9/1998 | Carpenter et al. | |
| 5,819,241 A | 10/1998 | Reiter | |
| 5,922,169 A | 7/1999 | Chodacki et al. | |
| 6,155,732 A | 12/2000 | Plasschaert et al. | |
| 6,182,730 B1 | 2/2001 | Muir | |

(Continued)

FOREIGN PATENT DOCUMENTS

EP 0 597 470 A1 5/1994

(Continued)

*Primary Examiner* — John W Hayes
*Assistant Examiner* — David J Clark
(74) *Attorney, Agent, or Firm* — McDermott Will & Emery LLP

(57) ABSTRACT

The present subject matter relates to a method and system for labeling a mail piece, and more specifically, to the application of variable sized labels to mail pieces based on the contents of the label and real-time mail processing information. More particularly, the present approach involves calculating expected label preparation time based on configuration of a labeler and printer timing information and/or real-time performance measurements to determine execution of information content printing, label feeding and cutting.

6 Claims, 6 Drawing Sheets

Dynamic labeling system diagram

U.S. PATENT DOCUMENTS

| | | |
|---|---|---|
| 6,268,032 B1 | 7/2001 | Mertens et al. |
| 6,387,203 B1 | 5/2002 | Boreali et al. |
| 6,391,132 B1 | 5/2002 | Kinnemann et al. |
| 6,610,955 B2 | 8/2003 | Lopez |
| 6,655,251 B2 | 12/2003 | Guidetti |
| 6,880,440 B2 | 4/2005 | Gass et al. |
| 7,034,855 B2 * | 4/2006 | Muto et al. ............ 347/180 |
| 7,121,311 B2 | 10/2006 | VanderSyde et al. |
| 2002/0034602 A1 | 3/2002 | Mertens et al. |
| 2002/0066991 A1 | 6/2002 | King et al. |
| 2002/0134712 A1 * | 9/2002 | DeWitt et al. ............ 209/584 |
| 2002/0175049 A1 * | 11/2002 | Flores ............ 198/502.3 |
| 2003/0144853 A1 | 7/2003 | Stehouwer et al. |
| 2003/0168178 A1 | 9/2003 | Francke et al. |
| 2004/0244913 A1 | 12/2004 | VanderSyde et al. |
| 2005/0139323 A1 * | 6/2005 | Syde et al. ............ 156/387 |

FOREIGN PATENT DOCUMENTS

| | | |
|---|---|---|
| EP | 1 125 849 A2 | 8/2001 |
| EP | 1 447 333 A1 | 8/2004 |
| EP | 1 466 830 A1 | 10/2004 |
| EP | 1 707 492 A1 | 10/2006 |
| WO | WO 92/13769 | 8/1992 |
| WO | WO 03/086873 A1 | 10/2003 |
| WO | WO 2005/047115 A1 | 5/2005 |

* cited by examiner

Dynamic labeling system diagram

DYNAMICALLY CHANGING LABEL SIZE DURING MAIL PROCESSING

RELATED APPLICATIONS

This application claims the benefit of U.S. Provisional Application No. 60/647,432, filed on Jan. 28, 2005, entitled "DYNAMICALLY CHANGING LABEL SIZE DURING MAIL PROCESSING", the disclosure of which also is entirely incorporated herein by reference.

This application is related to U.S. application Ser. No. 10/884,214, filed Jul. 2, 2004, which is a continuation-in-part of U.S. application Ser. No. 10/745,157, filed Dec. 23, 2003, which claims priority to U.S. Provisional Application No. 60/461,992, filed Apr. 11, 2003.

TECHNICAL FIELD

The subject matter presented herein relates to a method and system for labeling a mail piece, and more specifically, to the application of variable sized labels to mail pieces based on the contents of the label and real-time mail processing information.

BACKGROUND

Automated document processing devices, such as sorters or inserters, are commonly used in the mail processing industry, and are often equipped with various peripheral or in-line devices that further ease the processing and distribution of mail. An example of such a device is a labeler, which may be used in conjunction with the document processing device for applying a label to a mail piece. In addition, a printer may be used in conjunction with the labeling device for applying print contents to the label before or after its application to a mail piece. Print contents on a label can be one or more lines, and will vary depending on the way in which the label is to be applied to a given mail piece. As such, different-sized labels must be generated for different applications. For basic barcode printing, the label can be set to a default value of approximately 0.5-inches tall. However, for address block printing or customized message printing, a larger label may be required ranging from about 0.5 to 1.25 inches or more height as the length of the print content increases.

As illustrated in FIG. 7, various types of labels capable of being applied to a mail piece are shown. A first label 300 is comprised of a three line address block, while a second label 302 has a six line address block. Also, a third label 304 has a barcode printed on it, while a fourth label 306 has a corporate logo printed on it. Each of labels 300, 302, 304 and 306 has a specified height, represented as H1, H2, H3 and H4 respectively. The labels 300, 302, 304, 306 may also be assigned a default label margin, $H_{margin}$, for determining an inner perimeter for the application of print contents. For this example, it is assumed that the labels all originate from the same label roll, wherein the individual label length L of the label from each print roll is fixed (by the lateral dimension or width of the label material on the roll). Hence, variation in label height (amount of material pulled off the roll for a particular label) is generally the means by which to accommodate the varying print contents of labels 300, 302, 304, 306. As illustrated in FIG. 7, height H2, having the most print contents is of a larger size than that of height H3. In conventional mail processing environments, the various sized labels shown in FIG. 7 would be applied during separate job runs. So for instance, mailings having print contents requiring a label of height H2 would be processed during a first job run, while mailings having print contents of H4 would be applied during a second run.

Proper application of uniformly sized labels to mail pieces having uniform mail piece characteristics (e.g., height, length) is the simplest way to ensure effective labeling, especially due to the high transport speed of most document processing devices. Such uniformity allows for easier programming and cycle timing of the labeler and/or label printer. Sensors are positioned in fixed locations on a mail transport to determine mail feed and advance; to more easily allow the labeler to predict when to prepare for the next label. Such an approach is limiting however and quite impractical, particularly when different sized mail pieces having different sized label print contents must be processed during a single job run. Even when mail pieces are relatively identical, the mail gap, defined as the relative time/distance interval between mail pieces, may vary. Consequently, to overcome such challenges, mail processing facilities resort to simply applying a fixed label size to specific batches of mail. While this fulfills the labeling task, such a scheme is neither ideal nor accommodating of multiple-type mail piece processing.

As a further complication with fixed (unconditional) labeling systems, if the system misses applying a label due to erroneous peripheral performance or mail handling, the mail transport system must be stopped, and the label already fed and cut onto the label application paddle must be manually removed to prevent mislabeling of subsequent mail pieces. Failure to manually correct the mislabeling could result in the incorrect label being applied to each and every one of the subsequent mail pieces. Unfortunately, the manual resolution and overall lag time that occurs in this scenario significantly limits the throughput and efficiency capability of a high speed document processing device.

Adverting to FIG. 4(a), illustrated therein is a timing analysis diagram for a conventional label feed system. During a conventional single label feed cycle, a signal plateau 502 defines the length of a label to be applied to a mail piece. A signal acceleration phase (signal ramp up) 501, plateau phase (signal apply) 502, and deceleration phase (signal ramp down) 503 are shown in FIG. 4(a). Between the time of activation of the signal acceleration phase 501, the plateau phase and the signal deceleration phase 503, various labeling activities may occur including: actuation of the label cutter, printing of the label contents onto the label, deactuation of the cutter, activation of the label feed paddle for feeding of the label onto the mail piece, and deactivation of the label feed paddle to release the label fully onto the mail piece. To align these activities during the label feed cycle, proper timing and sequencing of events is critical.

When a label is applied in a uniform or fixed manner (e.g., according to conventional label feed cycle processing) without accounting for variances in mail gap that may occur between mail pieces, this is known as unconditional labeling. Mail gap refers to the relative time and distance relationship between mail pieces being processed by the document processing system. Since mail feed processing rates and performances may differ from one document processing system to the next, different mail gap between pieces may occur. The result is a one-size-fits-all labeling approach—an approach that does not account for differences in label sizes with respect to the contents to be printed upon the label. Consequently, when the labeler feeds and cuts a label of a certain size (even if it is of the wrong size to accommodate the print contents), the label must be applied to a document. If an incorrect-size label is fed and cut on the label application paddle, manual intervention must occur to remove the label, which means complete stoppage of the document processing system and reduction in throughput and processing efficiency.

Even when the labeling application involves uniform-size mail pieces, an incorrect-size label can still be fed and cut by the labeler due to inconsistent mail gap between documents as previously described, and different label size. Thus, even the same sized mail piece may still require a different size label to accommodate different print contents. As such, each piece will require different timing to feed and cut a label of different size for its print contents. In high-speed labeling applications, these factors combined to produce inconsistent time allowed for label feed cycles between documents in the mail processing stream.

To address the problems described above, a system is needed that can minimize if not completely eliminate the possibility of mislabeling or failing to label a mail piece requiring a label. Furthermore, a system and methodology is needed to accommodate variable sized labeling capability to support varying labeling applications for a high-speed transport system.

SUMMARY

The teachings herein alleviate one or more of the above noted problems through the utilization of a system for dynamically adapting the label size to be applied to a mail piece during mail processing based on the contents of the label and/or real-time mail processing information. In accordance with specific teachings disclosed herein, the control logic for enabling real-time variable label application is implemented as one or more processing modules. In one example of this application, a label control module performs functions for facilitating optimal label feed and cut, label web advance, label placement, paddle actuation and paddle deactuation. Another module for transport control interacts with the label control module, and is responsible for tracking a document from mail input all the way to the mail stacking section, while gathering and calculating various run-time data related to the mail piece (e.g., expected time of label application, mail pitch, mail gap). The transport module also coordinates the activities of mail peripherals (not shown) specialized in the area of image capture, barcode reader, OCR decode, label application, label printing, and document stacking.

In yet another example, the label control module takes one or more detector or measurement device outputs and controls the timing for the label printing and the timing for label advance into a label cutter, cutting and application of the label to the correct item in the prescribed location on the item. Detector and measurement devices include but are not limited to photo sensors, OCR recognition results, surface reflectance and transparency, radio-frequency identification (RFID), barcode or 2-D matrix reader output, label clear zone detection and location, thickness/height/width/weight measurement, and imaging systems capable of detecting unique item features for quality control or mail piece identification purposes. The detector and measurement device outputs can be used to extract correct label print contents from a database file for preparation of label print contents. Having determined the correct label print contents along with appropriate timing data for label placement, the correct or optimal label size and application point can be determined for labeling the mail piece. Such functionality enables consistently correct labeling of mail pieces in real-time so as not to jeopardize the throughput capacity of the document processing system.

In accord with the present concepts disclosed herein, there is provided a method for labeling a mail piece. The method involves detection of a mail piece requiring application of a label during run-time of a document processing device. An expected preparation time is calculated based on run-time data obtained prior to application of the label to the mail piece. The method includes applying the label of sufficient size to accommodate information content to be generated upon the label based upon the expected preparation time.

It is also desirable to provide a method for preventing the incorrect application of label containing information content to a mail piece. The method includes calculating an expected preparation time of the label prior to the application of the label to the mail piece. A determination is made as to whether or not to apply the label to the respective mail piece, based on the expected preparation time of the label. The determination to apply the label results in at least cutting of the label prior to its application to the mail piece and the determination not to apply the label results in no application of the label to the mailpiece.

It is also desirable to provide a method for dynamically adjusting a size of labels to be applied to mail pieces during mail processing based on information content to be generated upon each respective label. The method includes, for each mail piece, executing a first label feed cycle, the first label feed cycle resulting in feeding of a label with a default label size. A determination is made for each respective mail piece as to whether the default label size is sufficient to accommodate the contents to be generated upon the label for the respective mail piece. For those respective mail pieces for which the default label size is not sufficient, a second label feed cycle is executed based upon the expected preparation time required to apply the label to the mail piece. The second label feed cycle results in at least the cutting of the label to a size greater than the default label size.

Additional advantages and aspects of the present subject matter will become readily apparent to those skilled in the art from the following detailed description, wherein embodiments of the present subject matter are shown and described, simply by way of illustration of the best mode contemplated for practicing the present subject matter. As will be described, the present subject matter is capable of other and different embodiments, and its several details are susceptible of modification in various obvious respects, all without departing from the spirit of the present subject matter. Accordingly, the drawings and description are to be regarded as illustrative in nature, and not limitative.

BRIEF DESCRIPTION OF THE DRAWINGS

The following detailed description of the embodiments of the present subject matter can best be understood when read in conjunction with the following drawings, in which the various features are not necessarily drawn to scale but rather are drawn as to best illustrate the pertinent features, and in which like reference numerals are employed throughout to designate similar features.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The concepts described herein pertain to document processing, and more specifically to the processing of mail pieces by a document processing system. Document processing systems include, but are not limited to, inserter devices, mail sorting devices for inbound or outbound mail processing and distribution, and any other such transport devices. Such systems may utilize a plethora of peripheral devices placed in-line or externally operable in connection with the document processing system, such as printers, control computers, data reader devices, vision systems, etc. Those skilled in the art will recognize that a document processing system can refer to any system or device configuration that employs one or more, or the combination of many of the above mentioned devices for the purpose of facilitating the processing of mailings.

Also, as used herein, a mail piece refers to any document that is capable of being processed by a document processing device or system. While in the traditional sense a mail piece may be taken to mean an envelope having various human or machine readable address markings, those skilled in the art will recognize that other document types fall into the category of a mail piece, including but not limited to: magazines, newspapers, flat mail, packages of varying sizes, brochures, postcards, coupons and coupon books, booklets, single sheet documents, multiple sheet documents, etc. Virtually any document requiring a printed label, that is destined to be mailed or distributed to one or more parties, is a mail piece that can be used with the document processing equipment described herein.

Figure 1:
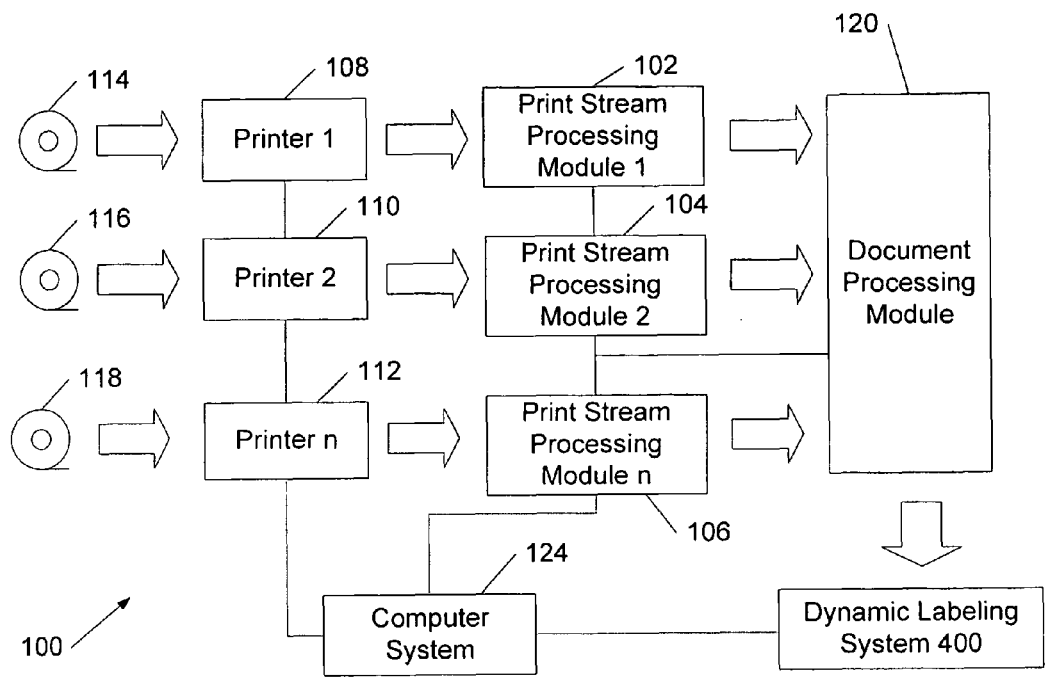
FIG. 1 depicts an exemplary high-level block diagram of a document processing system with a dynamic labeling system.

FIG. 1 depicts a high-level block diagram of a document processing system 100 for which throughput via expanded labeling capability can be optimized utilizing the novel dynamic labeling size concepts discussed herein. Essentially, the system 100 comprises a plurality of print stream processing modules 1-n. The print stream processing module 1 is designated by reference number 102, the print stream processing module 2 is designated by reference number 104, and the nth print stream processing module is designated by reference number 106. In certain embodiments, there may be two, three or more print stream processing modules. Each print stream processing module 102, 104, 106 may perform one or more operations such as material cutting, assembly, folding, material authentication, etc. Each is modular in the sense that each can be designed differently to perform one or various functions. The concepts discussed herein are not limited to the number of print stream processing modules or specific functions of each discussed herein.

Upstream from each print stream processing module 102, 104, 106 is a printer 108, 110, 112, each fed from a roll of continuous form material 114, 116, 118. Alternatively, non-continuous material (e.g., individual sheets) may be used. The printers 108, 110, 112 generate a print stream for the print stream processing modules 102, 104, 106, respectively. Each print stream processing module 102, 104, 106 is shown to receive a print stream from each printer 108, 110, 112, respectively. The manner in which the print streams are provided to the print stream processing modules are not limited with respect to the present teachings. The print streams may be applied in an online manner, whereby the output of each printer is fed to a respective print stream module. In alternative embodiments, the print streams may be generated offline, and assembled in bins, which are later applied to the print stream processing modules. Moreover, a printer 108, 110, 112 may feed more than one print stream processing module 102, 104, 106. A printer 108, 110, 112 may have two outputs, each outputting a print stream to two print stream processing modules 102, 104, 106.

A document processing module 120 positioned downstream from the print stream processing modules 102, 104, 106, processes the output of each print stream processing module. An exemplary module may include a machine for inserting material, such as credit cards, personalized statements, advertisements, etc. A finishing module (not shown) positioned downstream from the document processing module 120 may be utilized to insert material in an envelope, sort the output mail, etc. As will be discussed in a later section of the description, additional peripheral or internal devices may be used in connection with the document processing module 120 or finishing module for processing a mail piece, such as a labeler and/or label printer of the dynamic labeling system of FIG. 3.

Each of the printers 108, 110, 112, print stream processing modules 102, 104, 106, document processing module 120 and finishing module (not shown) may be controlled by a computer system 124. The computer system 124 may have numerous functions, some of which include generating print files for each printer 108, 110, 112 from a job file; and controlling the operation of each print stream processing module 102, 104, 106, the document processing module 120 and the finishing module. The computer system 124 may also control a label printer, which is used in connection with a labeling device for applying labels to a mail piece as it is transported through the document processing system 100. Although shown as a single computer 124, those skilled in the art will recognize that a system 100 may use a network of controlled computers to implement the relevant data processing and/or control functions.

Figure 2:
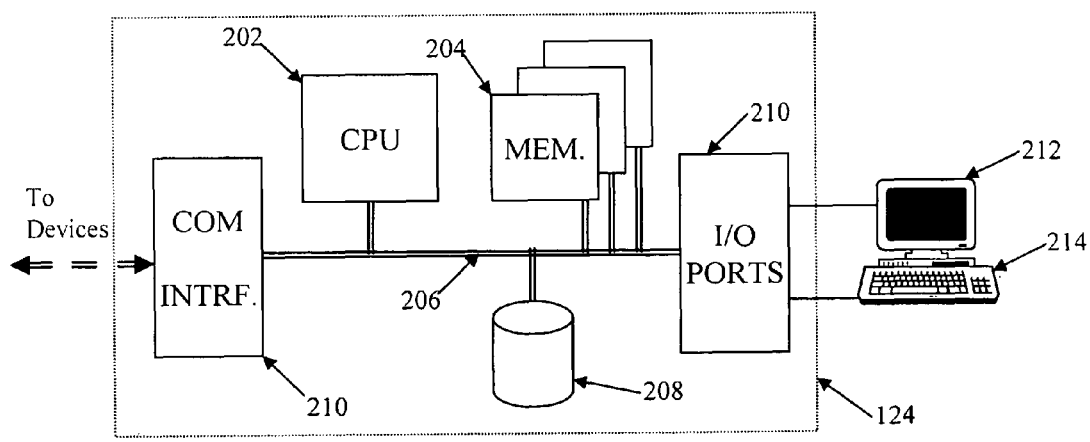
FIG. 2 depicts an exemplary computer used in conjunction with the document processing system described herein.

FIG. 2 is a functional block diagram of computer system 124. The computer system 124 receives print files or generates print files from a job file, develops optimized print streams, and sends print streams to printers 108, 110, 112. Based on these print streams, computer system 124 may send Mailer USPS or other postal authority documentation to a printer (not shown) or another appropriate output device based the print streams sent to the printer.

When the computer system, or one similar to it, is used for generating labels, the computer also reads the label contents from a print file. For applications where the same label is applied to a plurality of mail pieces being processed by the system 100, the job file need only specify a singular or limited set of data to be reproduced. However, in instances where each mail piece may require a different set of label contents, the print file is more robust. As will be discussed in later paragraphs with respect to the teachings herein, a labeler control processing module, operating in conjunction with computer system 124, would interpret the contents of the print file and coordinate print timing accordingly to adjust label characteristics based on the label contents.

The exemplary computer system 124 may include a central processing unit (CPU) 202, memories 204, and an interconnect bus 206. The CPU 202 may contain a single microprocessor, or may contain a plurality of microprocessors for configuring the computer system 124 as a multi-processor system. The memories 204 include a main memory, a read only memory, and mass storage devices such as various disk drives, tape drives, etc. The main memory typically includes dynamic random access memory (DRAM) and high-speed cache memory. In operation, the main memory stores at least portions of instructions for execution by the CPU 202 and data for processing in accord with the executed instructions.

The mass storage 208 may include one or more magnetic disk or tape drives or optical disk drives, for storing data and instructions for use by CPU 202. For a workstation PC, for example, at least one mass storage system 208 in the form of a disk drive or tape drive, stores the operating system and application software as well as a data file. The mass storage 208 within the computer system 124 may also include one or more drives for various portable media, such as a floppy disk, a compact disc read only memory (CD-ROM or DVD-ROM), or an integrated circuit non-volatile memory adapter (i.e. PC-MCIA adapter) to input and output data and code to and from the computer system 124.

The computer system 124 also includes one or more input/output interfaces 210 for communications, shown by way of example as an interface for data communications via a network or direct line connection. The interface may be a modem, an Ethernet card or any other appropriate data communications device. The physical communication links may be optical, wired, or wireless. The network or discrete interface may further connect to various electrical components of the document processing modules, discussed herein, to transmit instructions and receive information for control thereof (e.g., print file information stored locally 208 or as received remotely for enabling network printing). The network shall include any type of communication implementation for receiving and transmitting information to and from components of the document processing system 100 and components external to and/or remote from the system 100.

The computer system 124 may further include appropriate input/output ports for interconnection with a display 212 and a keyboard 214 serving as the respective user interface. For example, the computer system 124 may include a graphics subsystem to drive the output display. The output display may include a cathode ray tube (CRT) display or liquid crystal display (LCD). Although not shown, the PC type system typically would include a port for connection to a printer. The input control devices for such an implementation of the system would include the keyboard for inputting alphanumeric and other key information. The input control devices for the system may further include a cursor control device (not shown), such as a mouse, a trackball, a touchpad, stylus, or cursor direction keys. The links of the peripherals to the system may be wired connections or use wireless communications.

The computer system 124 shown and discussed is an example of a platform supporting processing and control functions of the document processing system described herein. The control processing functions and the labeling operations capabilities discussed herein may reside on a single computer system, or two separate systems; or one or both of these functions may be distributed across a number of computers. Likewise, the control processing function and labeling operations may be implemented as one or more microprocessors or executable modules (e.g., firmware) that reside and operate upon the computer system 124

The software functionalities of the computer system 124 involve programming, including executable code as well as associated stored data. Software code is executable by the general-purpose computer 124 that functions the system controller. In operation, the code and possibly the associated data records are stored within the general-purpose computer platform 124. At other times, however, the software may be stored at other locations and/or transported for loading into the appropriate general-purpose computer system. Hence, the embodiments involve one or more software products in the form of one or more modules of code carried by at least one machine-readable medium. Execution of such code by a processor of the computer platform enables the platform to implement the dynamic label size control and related document processing control functions, in essentially the manner performed in the embodiments discussed and illustrated herein.

As used herein, terms such as computer or machine "readable medium" refer to any medium bearing the code, algorithms, routines or instruction(s) that may participate in the functions of a processor and/or bearing one or more of the data files to facilitate dynamic labeling. Such a medium may take many forms, including but not limited to, non-volatile media, volatile media, and transmission media. Non-volatile media include, for example, optical or magnetic disks, such as any of the storage devices in any computer(s) operating as one of the system control platform 124, discussed above. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution and/or in carrying one or more data files to a computer or to a printer.

Figure 7:
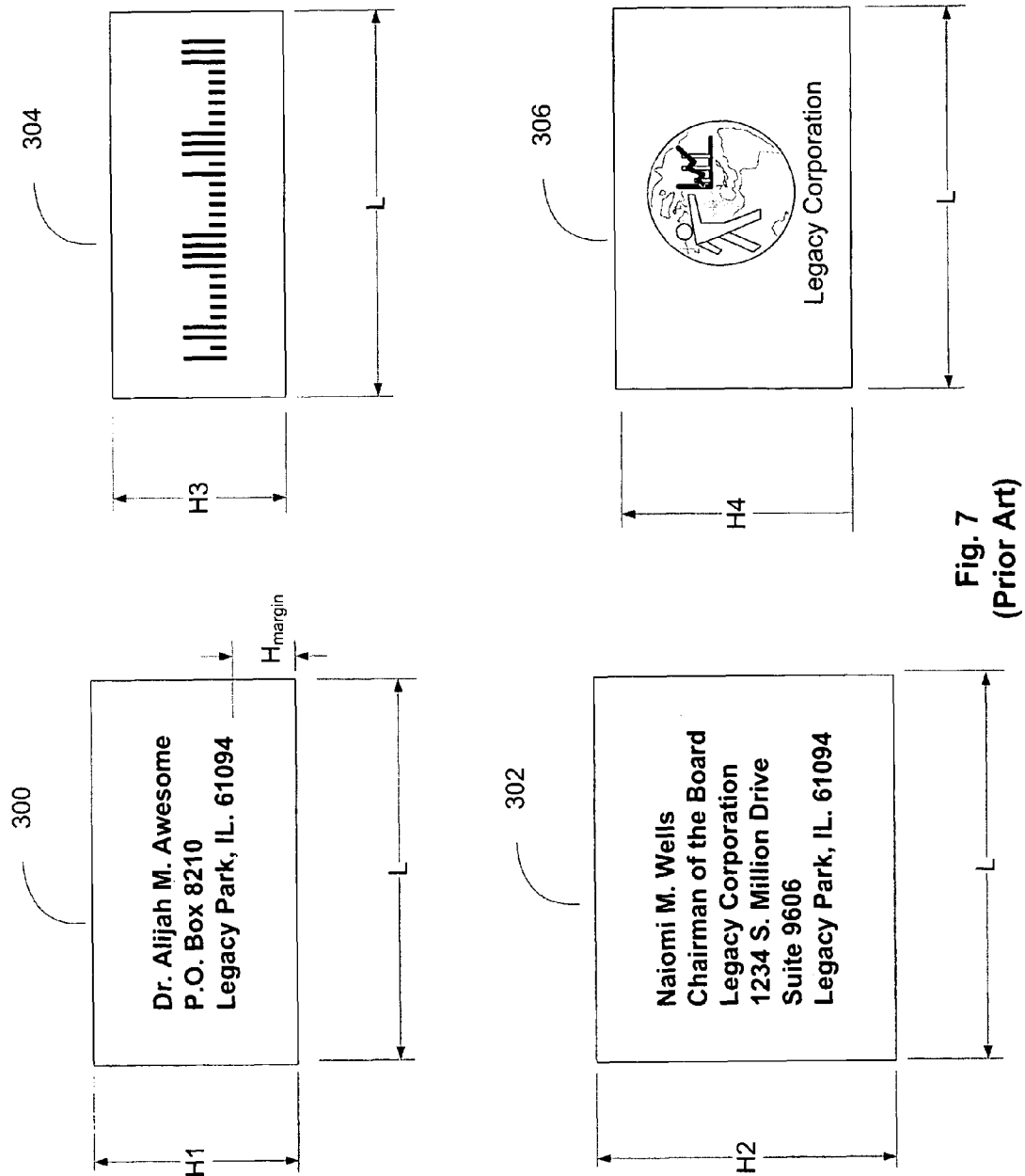
FIG. 7 depicts various sizes of labels which may need to be applied to different mail pieces.

As previously discussed, with conventional mail processing environments, the various sized labels shown in FIG. 7 need to be applied during separate job runs. As such, the labels are often applied to a mail piece based on fixed application criteria. The various techniques in accordance with the present concepts, however, allow for variable sized label application during the same job run (if desired by the mail processing device operator) based on real-time and/or run-time mail processing information. An exemplary system configuration for enabling such capability for a document processing system 100 (FIG. 1), such as a package conveyer, printing press, sorting system, inserter or other mail transport system, is shown in FIG. 3.

Figure 3:
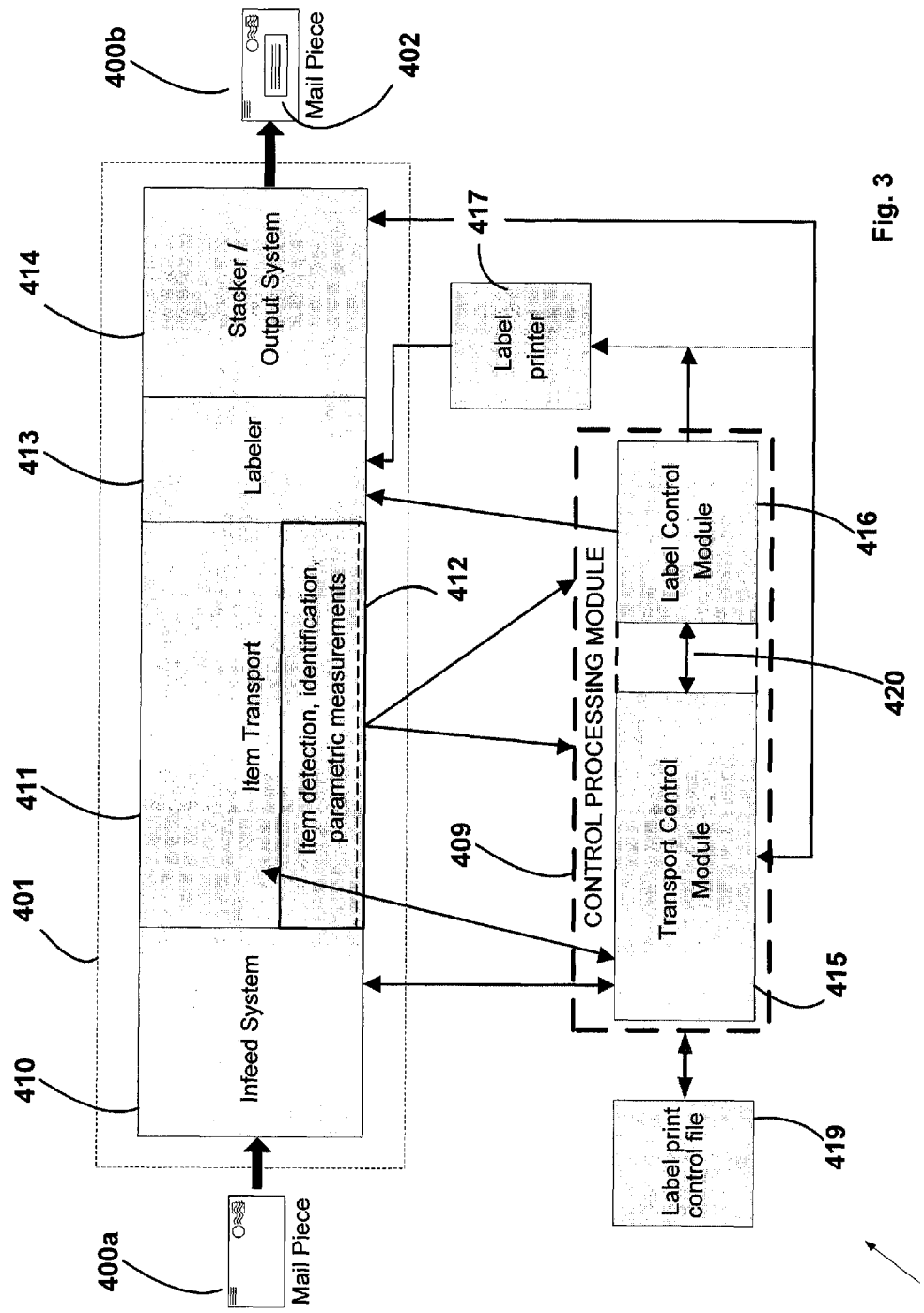
FIG. 3 depicts an exemplary high-level diagram of the system architecture for enabling variable sized label application during the run-time of a document processing system.

An exemplary high-level diagram of the dynamic labeling system for enabling variable sized label application during the run-time of a document processing system is shown in FIG. 3. As illustrated in FIG. 3, an infeed system 410 receives mail piece 400(a) as input into a document processing system 100, where the mail piece 400(a) is further processed downstream by the item transport 411. Various functions may be performed upon mail piece 400(a) during the transport stages, including but not limited to insertion or folding operations, object character recognition (OCR) or barcode detection. The mail piece 400(a) is subsequently labeled by a labeler device 413 operating in conjunction with a label printer 417. The label printer 417 has access to a control file 419 which specifies the print contents to be applied to the mail piece 400(a). Once the label is applied to the mail piece 400(a), the document is stacked accordingly by a stacker device 414. The resulting output is a mail piece 400(b) having an appropriately applied label 402.

Various labeler devices are known in the art. Examples of labeler devices that can be included for operation with a document processing system are described in U.S. Pat. Nos. 5,922,169 and 5,783,032, as well as U.S. application Ser. No. 10/884,214, filed Jul. 2, 2004 and U.S. application Ser. No. 10/745,157, filed Dec. 23, 2003; each of which is incorporated herein by reference.

To ensure optimal application of the label to account for varying print contents, a label control processor 416 may be included via a control processing module 409. The control processing module 409 may itself be comprised of one or more machine readable instructions or computer executable modules implemented as software, firmware or as microprocessor based modules. As illustrated in FIG. 3, transport control module 415 and the label control module 416 are examples of machine or computer executable modules. The two modules 415, 416 communicate with each other via a communication link 420 such as serial RS232, Ethernet, or any industrial field bus. As such, the label control module 416 sends data and/or signals to the transport control module 415, and the transport control module 415 can also send data and/or signals to the label control module 416.

The transport control module 415, which may be implemented as a separate computer system (e.g., such as computer system 124 or another type of control computer), is responsible for tracking mailpiece 400(a) from infeed system 410 to stacker device 414. Still further, the transport control module 415 also coordinates the activities of mail peripherals (not shown) specialized in the area of image capture, barcode reader, OCR decode, label application, label printing, and document stacking. The OCR and/or BCR output data is utilized to determine whether a label needs to be applied to a mail piece. Label application depends on system processing requirements. For instance, if the OCR or BCR utility or detectors cannot recognize sufficient details of address block components upon a mail piece 400(a) to determine a final sort decision, processing requirements may include printing an identification code on a label and then applying the printed label on the reject document. If the OCR or BCR utility generates a valid sort decision, however, processing requirements may include applying a label on a mail piece and then printing a destination barcode such as USPS POSTNET code on a mail piece to facilitate subsequent mail sorting. In either scenario, the transport control module 415 determines the necessity of applying a label and determining the print contents on a label.

Complimentary to the transport control module 415 is the labeler control module 416, which enables the labeler 413 to perform various functions including but not limited to: label feed and cut, label web advance, label placement, label paddle arm actuation and paddle arm deactuation. To facilitate control of the labeler device 413, the label control module 416 utilizes one or more detectors or measurement device outputs 412 and controls the timing for the label printer 417 and the timing for label advance into a label cutter for cutting and application of the label to the correct mailpiece in the prescribed location on the mailpiece. Detector and measurement devices 412 include, but are not limited to, photo sensors, OCR recognition results, surface reflectance and transparency data, radio-frequency identification (RFID), barcode or 2-D matrix reader output, thickness/height/width/weight measurement data, label clear zone detection and location data, and imaging systems/devices capable of detecting unique item features for quality control or identification purpose. The detector and measurement device outputs can be used to extract correct label print contents from a database file 419 for preparation of label print contents. With the right label print contents, the correct or optimal label size can be determined.

While the functions of the control processing module 409 are presented in the foregoing paragraphs as being implemented as separate modules, those skilled in the art will recognize that the transport control module 415 and label control module 416 can be implemented as a single processor or a computer. Various implementations may be applied to meet cost effectiveness and system package requirements.

Figure 4A:
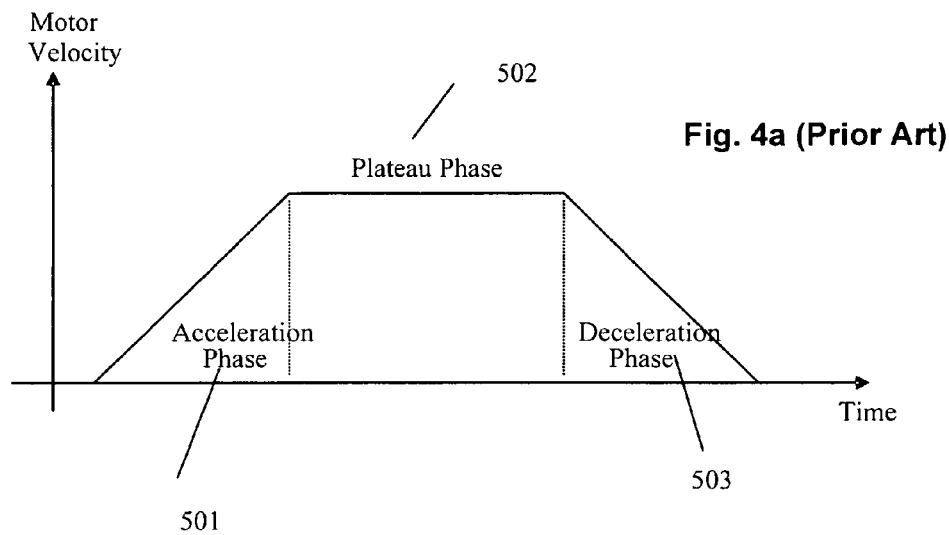
FIG. 4a depicts a timing analysis diagram for a conventional label feed system.
Figure 4B:
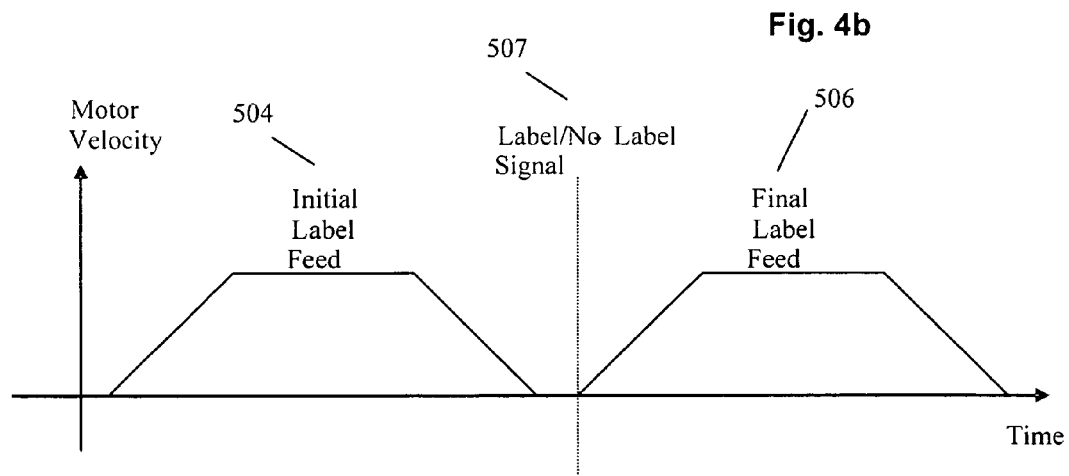
FIG. 4b depicts an exemplary timing analysis diagram for enabling variable sized label application during the run-time of a document processing system.
Figure 5:
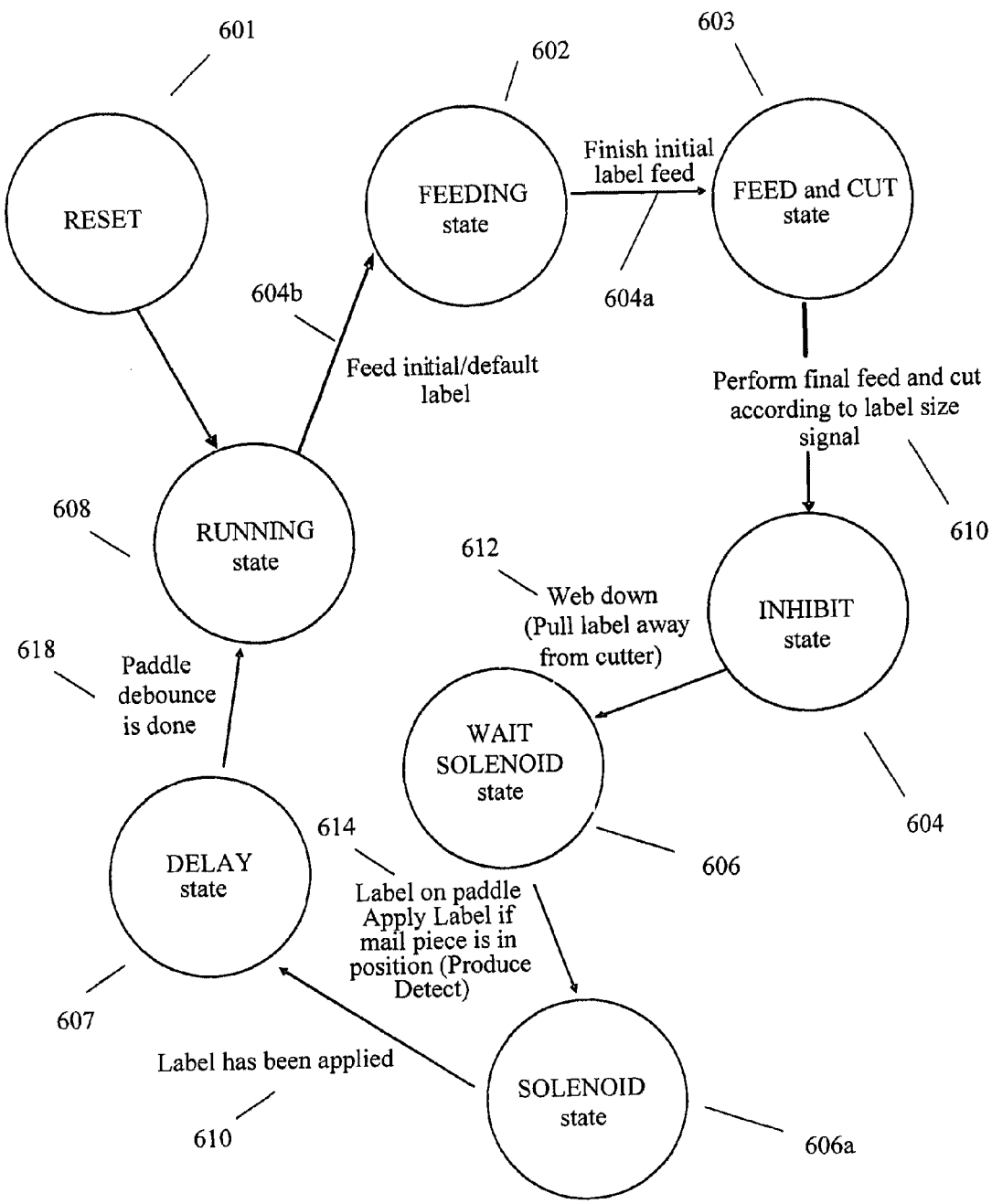
FIG. 5 depicts an exemplary state diagram of a label feed cycle of a variable sized labeling system by way of a state diagram.

To overcome the challenges with respect to unconditional labeling, an exemplary state diagram and timing analysis scheme is provided for enabling variable height labeling is presented in FIGS. 4b and 5. For variable label applications, the signal is broken into discrete parts 504 and 506 as shown in FIG. 4b. Namely, a first discrete signal phase, known as an initial label feed cycle 504, is generated and followed by a second discrete signal phase known as a final label feed cycle 506. This innovative 2-stage label feed offers opportunity for further customization. With this configuration, the labeler can be programmed to feed the smallest applicable label size in the initial stage label feed 504, while any label to be applied beyond the smallest applicable label size (default size) is processed during the second or final label feed cycle 506. In other words, if the default sized label is to be applied, the cutting and feeding of the label occurs during the initial cycle. However, if a label larger than the default size is required, then the label is fed during the initial cycle without cutting, and additional label is fed during the final cycle, followed by a label cut step in the final cycle.

The discrete label feed cycles 504 and 506 are implemented via label apply signal 507. The label apply signal 507 indicates whether any additional label is required to be applied beyond the initial label feed cycle 504, and if so, the final label height information of the label. This information is then passed on to the labeler software so the labeler can perform the second or final stage of label feed cycle 506. In instances where no additional label is to be applied beyond the minimum label height—the default label size—the final label feed cycle is not executed, and the label applied during the initial label feed cycle is cut and affixed to the mail piece. Hence, in instances where there is additional label needed to be applied beyond the minimum label height, the initial label feed cycle does not result in the actual cutting of the mail piece.

In FIG. 5, the state transition diagram for conditional (unfixed or variable) labeling is shown. After system reset 601 the labeler detects mail presence at a fixed-position sensor and transits from the RUNNING state 608 to the FEEDING state 602. As these phases are invoked, the initial feed cycle 604b is performed. The addition of the label apply signal 507 introduces the final label feed cycle shown as the FEED and CUT state 603, which also signifies the finishing of the initial label feed state 604a. An INHIBIT state 604 is then enacted upon final feed and cut, wherein the label is applied up to the final label size as specified 610 and the label is pulled away from the cutter 612. After the enactment of a WAIT SOLENOID state 606, a determination is made as to whether or not a label can be properly applied to the mail piece given known mail processing information. Mail processing information includes, but is not limited to, mail gap data, mail pitch (edge-to-edge) timing and/or distance data, label print contents, mail piece size, or other such data. Such information is obtained or calculated in whole or in part by the one or more detector or measurement device outputs 412. When there is not enough execution time to properly apply a label to the mail piece, such as due to improper gap spacing/timing, no label is applied and RUNNING state 608 is eventually reentered. On the other hand, when the mail processing information and calculation is such that a label can be applied properly 614, the SOLENOID state 606a transitions to a DELAY state 607 for paddle setting 618, and then re-enters the RUNNING state 608. Hence, the label is applied to the paddle, and then subsequently to the mail piece. After applying a label to a document, the labeler controller automatically feeds another label on the paddle to wait for the next piece.

An example of an application of a variable height label with respect to the specific examples and techniques presented herein is now described. If an application demands four different label heights such as 0.5, 0.75, 1.00 and 1.25 inches, the final label size can be specified with a 2-bit real-time hardware signal or a serial message. In this particular example, the initial feed cycle 504 will result in the application of the default 0.5-inch label. If the next document demands a 0.5-inch label, the second-stage feed-and-cut (final label feed cycle 506) will introduce no extra label height. Rather, the cutter would be activated as soon as the labeler receives a label apply signal via hardware input or serial communication. If, on the other hand, the next mailpiece demands a 0.75, 1.0 or 1.25-inch label, the second-stage label-and-cut 506 will introduce an extra 0.25, 0.5, or 0.75-inch of label before cutter actuation.

As another example, an application may demand only two different label sizes (1-inch or 1.25-inch label). In this case the initial feed corresponding to the first label feed cycle 504 will be 1-inch. As before, the user can control the initial label feed with a serial message or additional hardware signal. In a multiple stage label feed cycle as shown in FIG. 4b, the initial feed cycle and the final feed cycle go through separate motor acceleration and deceleration. If the application demands only one label size, the control logic allows the user to combine the two feed cycles into one. This may be necessary to ensure the fastest label feed speed available for optimal performance.

Regardless of the number of label feed cycles, the user can increase the default label length by stretching the plateau cycle 502. In other words, the rectangular area under the nominal velocity-time curve is increased such that the label size is increased. The number of motor counts for the plateau cycle can be specified via hardwired input signals or serial message to the labeler. Serial messages offer the greatest flexibility and for most applications, default label height as applied during the initial label feed cycle 504 can be specified as part of a pre-run configuration.

The control processing module 409 can have the ability to predict whether or not a label cycle can be completed to properly apply a label to each document. The host computer upon which the control processing module 409 operates, can use a signal to indicate a label apply decision to the label control processor 416 in real-time faster than serial communication scheme.

Figure 6:
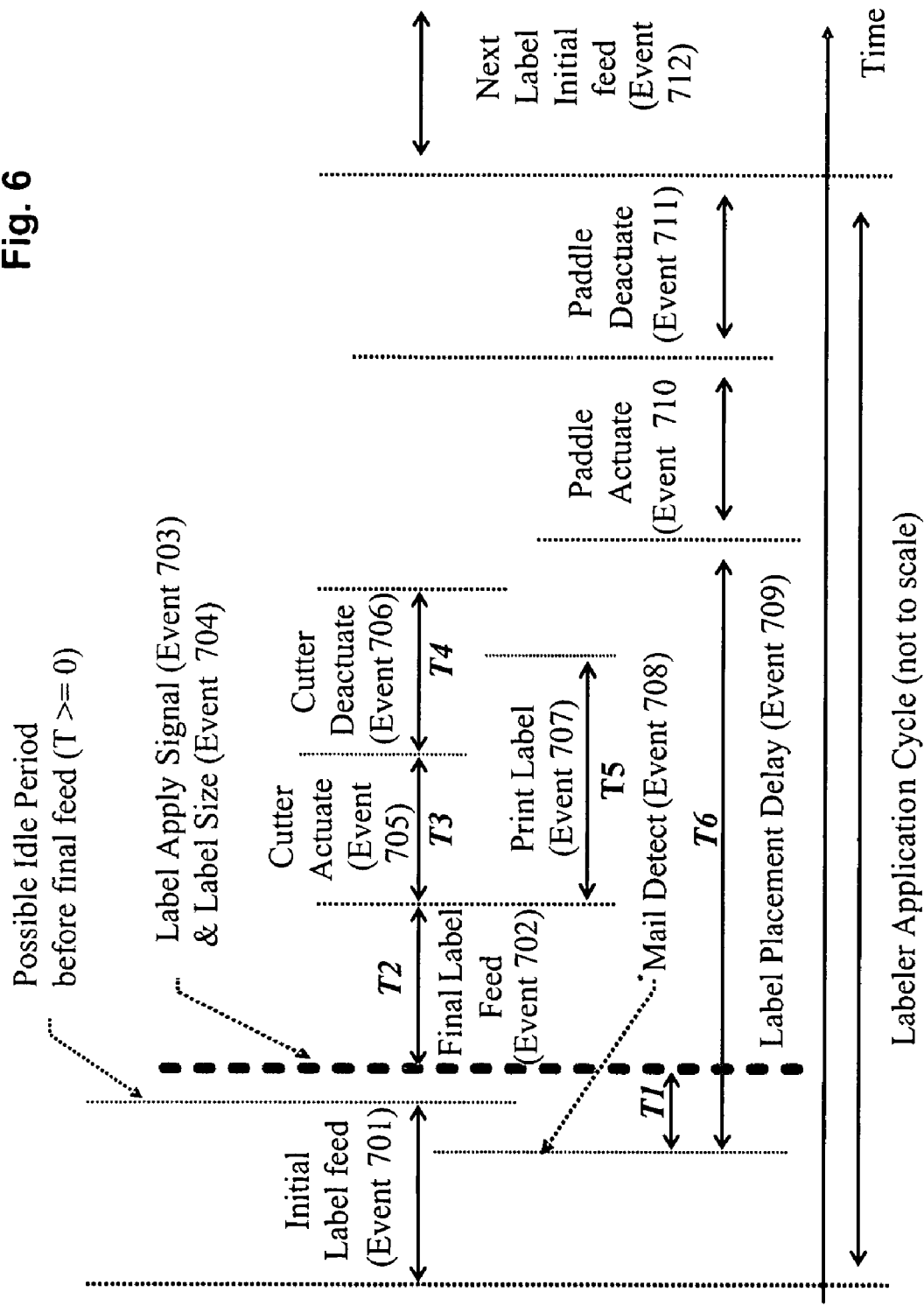
FIG. 6 depicts an exemplary high-level timing analysis diagram of a variable sized labeling process.

Referring now to FIG. 6, a high-level timing analysis diagram of the dynamic labeling process is presented. At the time the labeler receives the label apply signal decision Event 703 and the final label size information Event 704, the labeler software can calculate the amount of time required to execute the final label feed-and-cut cycle. The time required to complete the final label feed-and-cut cycle is the combined time of Events 702, 705, and 706. Initiation of Event 702 is possible only when the control processing module 409 sends the label apply signal Event 703 to the labeler control software along with the appropriate label size information.

Once events 702 through 706 are executed, the label print process Event 507 can start as soon as the final label feed cycle is complete. Alternatively, the label print can be delayed until after label cut is complete. This choice depends on final electromechanical design and print head position. In general, optimal configuration to minimize the amount of time to complete label preparation requires the print cycle to start as soon as the final label size is complete. In addition to completion of Event 707, correct label placement may also require the labeler to wait for a placement delay period Event 709 before Event 710 can start. Events 710 and 711 are responsible for applying the correct label to the document. Event 712 is the same as Event 701 but for the next item in the processing stream.

To predict when a document will reach a pre-determined position for label placement, one or more tracking sensors must be strategically placed so that the transport control module 415 and/or label control module 416 can track a document within range for label application. The main objective is to determine the timing between mail appearance and the label/no-label signal that initiates the final label feed. Since there is no recall after initiating the final label feed cycle, the label apply signal Event 702 must happen after the tracking sensor detects the mail appearance Event 708. Once the time difference between initial mail appearance and the label apply signal is known, the label control module 416 can predict whether the final label feed cycle 506 can be completed before the document reaches the final label placement position. In other words, whether there is enough time to apply any additional label to the mail piece, including cutting it, applying it to the label paddle, and subsequently affixing it to the mail piece. At that time Event 710, label paddle actuation for application of the label will take place.

Those skilled in the art will recognize that the tracking sensor used to detect "initial" mail appearance can be the same sensor used for determining final label placement. As an additional processing advantage, the product detect sensor for determining label placement should be placed adjacent to the label application paddle to minimize placement error. However label placement error depends on a number of factors including mail thickness, transport speed, mail surface and customer's requirements. Therefore a separate sensor is not always necessary to ensure precision of label placement for all applications.

As a further implementation for optimization of labeling performance, the transport control module 415 can use item tracking information 412 acquired during mail transport 411 to determine the exact timing for sending the label apply signal 703 to the labeler controller 416. As long as the label apply signal is present after mail detection 708, the label control module 416 can successfully calculate the expected delay to execute the entire label feed, cut and print cycle. In addition, the label apply signal can also provide an alert to labeler device 413 as to when to perform the initial feed. As such, the label control module 416 can be programmed to check the label apply signal before performing the initial feed cycle 504; the same as what the label control module 416 does before performing the second stage of label feed to yield the final label size. This may be desirable in some applications to avoid label clean up after system stop.

In the previous description, numerous specific details are set forth, such as specific materials, structures, processes, etc., in order to provide a better understanding of the present subject matter. However, the present subject matter can be practiced without resorting to the details specifically set forth herein. In other instances, well-known processing techniques and structures have not been described in order not to unnecessarily obscure the present subject matter.

Only the preferred embodiments of the present subject matter and but a few examples of its versatility are shown and described in the present disclosure. It is to be understood that the present subject matter is capable of use in various other combinations and environments and is susceptible of changes and/or modifications within the scope of the inventive concept as expressed herein.

What is claimed is:

1. A method for labeling a plurality of mail pieces, the method comprising steps of:
   detecting during run-time of a document processing device processing the plurality of mail pieces, a first mail piece and a second mail piece requiring application of a first label to the first mail piece and a second label to the second mail piece, wherein the first and second mail pieces are processed on the document processing device during the same run;
   calculating during run-time of the document processing device at least an expected preparation time required for the first and second labels based on run-time data obtained prior to application of the first and second labels to the first and second mailpieces, wherein the expected preparation time includes delay time associated with label feeding, cutting and printing and wherein the run-time data is based at least in part on variances in: mail gap between the plurality of mail pieces, mail piece size and mail pitch timing;
   applying on the first mail piece by way of a labeler device, the first label of sufficient size to accommodate information content to be generated upon the first label based upon its expected preparation time; and
   applying on the second mail piece by way of the labeler device, the second label of sufficient size to accommodate information content to be generated upon the second label based upon its expected preparation time,
   wherein the applied second label is greater in size than the applied first label.

2. The method of claim 1, wherein run-time data is further based on expected time of label application.

3. The method of claim 1, wherein the step of calculating includes determining information content to be generated upon each label.

4. A method for dynamically adjusting a size of labels to be applied to a plurality of mail pieces during a single mail processing run based on information content to be printed upon each respective one of the labels, the method comprising steps of:
   for each mail piece, executing a first label feed cycle, the first label feed cycle resulting in feeding of a label with a default label size by a labeler device;
   determining for each respective mail piece whether the default label size is sufficient to accommodate the contents to be printed upon the label for the respective mail piece; and
   for one of the respective mail pieces for which the default label size is not sufficient, executing a second label feed cycle based upon an expected preparation time required to apply the label to the one respective mail piece by the labeler device, the second label feed cycle resulting in at least the cutting of the label to a size greater than the default label size,
   wherein the expected preparation time is calculated based upon mail processing information, and the mail processing information is based at least in part on variances in: mail gap between the plurality of mail pieces, mail piece size, and mail pitch timing.

5. The method of claim 4, wherein the mail processing information is selected from the group consisting of: optical character recognition detection data, and bar code recognition detection data.

6. The method of claim 1, wherein the mail processing information includes data associated with the information contents to be generated upon each respective one of the labels.

* * * * *